Patented Apr. 10, 1945

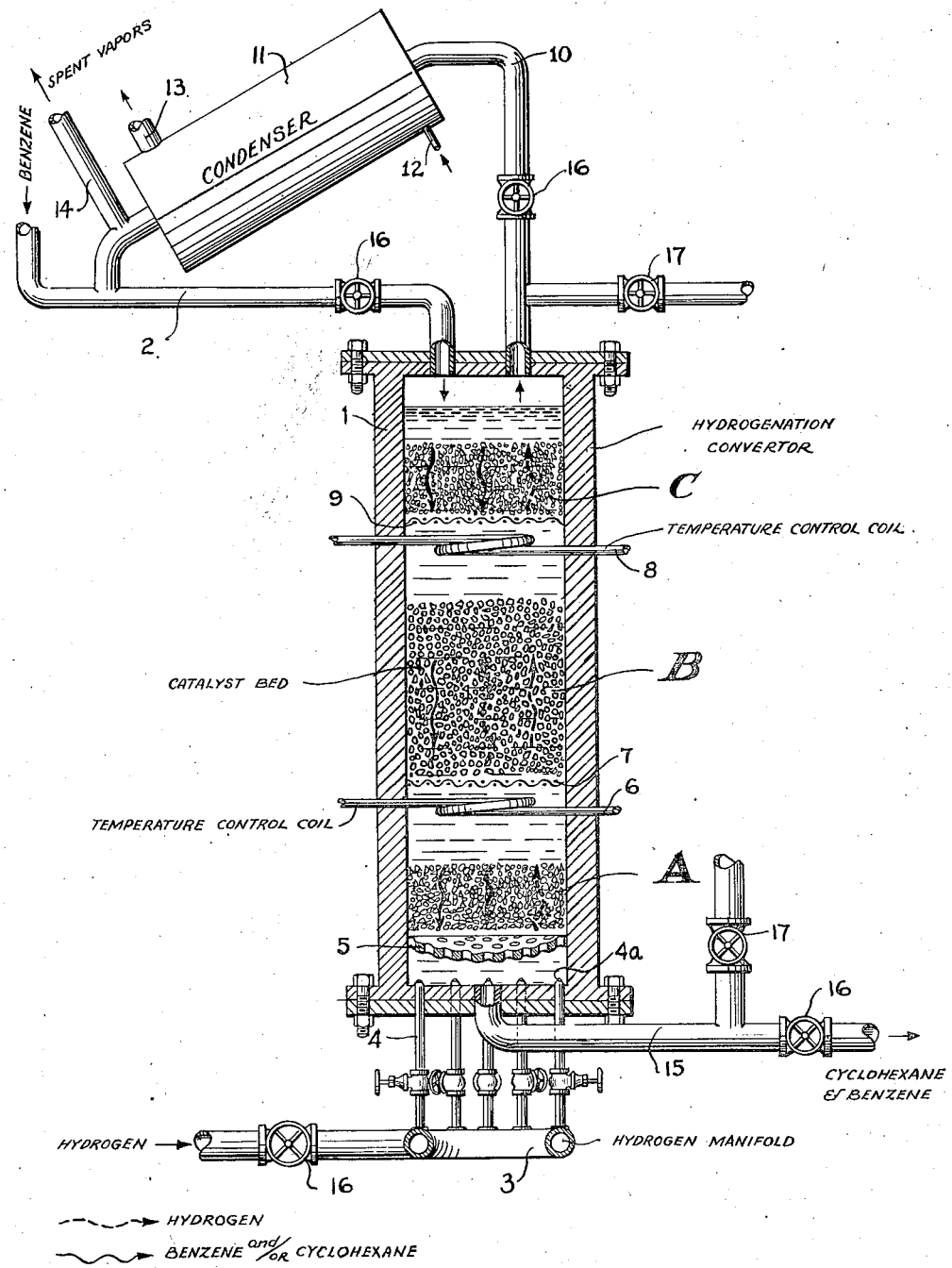

2,373,501

UNITED STATES PATENT OFFICE 2,373,501

PREPARATION OF CYCLOHEXANE

Merlin Dewey Peterson, Edgemoor Terrace, Del., assignor to E. I. du Pont de Nemours & Company, Wilmington, Del., a corporation of Delaware Application April 18, 1942, Serial No. 439,534

11 Claims. (Cl. 260—667)

This invention relates to the production of cyclohexane and more particularly to an improved process for its production by the catalytic hydrogenation of benzene.

In the manufacture of organic compounds, every effort is made to limit the extent of side reactions and thereby potentially, at least, increase the conversion to the desired product. Oxidation and hydrogenation reactions involving aromatic organic compounds are especially subject to side reactions with the concurrent decrease in yield of the products desired. Heretofore major attention has been directed, in general reactions of this nature, to the control of the reaction rate and especially the control of the temperature and pressure of the reaction whereby some inhibition in the rate of side product formation has been realized. In spite of very accurate temperature and pressure control, however, many organic reactions of this nature have not been sufficiently improved with respect to conversion rates to advance their use beyond the academic stage.

An object of the present invention is to provide an improved process for the hydrogenation of benzene to cyclohexane. Another object of the invention is to provide conditions for the hydrogenation of benzene to cyclohexane whereby substantially no by-products of the reaction are obtained. Yet another object is to provide reaction conditions such that the above objects are attained. Still another object is to provide a process for the hydrogenation of benzene to cyclohexane whereby the benzene flows continuously through the reaction zone all portions of which are not at the same temperature. Another object is to provide a temperature differential within the reaction zone whereby exceptionally high yields of cyclohexane by hydrogenation of benzene are realizable. A further object is to provide such a process wherein utilization of hydrogen is exceptionally high. Other objects and advantages of the invention will hereinafter appear.

In accord with the invention it has been found that benzene can be hydrogenated to cyclohexane to give substantially quantitative yields, together with efficient utilization of hydrogen, if the reaction is carried out within a reaction zone which is maintained with a differential temperature between that portion of the zone where the benzene concentration is high and that portion of the zone where the cyclohexane concentration is high. A further feature of the invention involves control of the temperature of the reaction and more especially the differential temperatures between portions of the reaction zone, such that the exothermic heat thereof is removed by condensation of the reactants vaporized throughout the reaction, whereby the necessity of using complicated expensive converters is avoided.

Attention is directed to the single figure which diagrammatically illustrates a preferred embodiment of the invention by an examination of which the features of the invention can be readily appreciated. A suitable hydrogenation catalyst is disposed in the converter 1 (the disposition of the catalyst being more fully particularized hereinafter), which is provided with pressure sustaining walls. Through the inlet pipe 2, benzene is introduced into the converter which is filled to a level above the catalyst in order to insure that throughout the reaction the catalyst will remain totally submerged. Hydrogen is introduced into the converter through the manifold 3 from which the hydrogen is led through pipes 4 fitted with suitable jets 4a which distribute the hydrogen uniformly into the base of the hydrogenation converter 1 from which the hydrogen is uniformly distributed into the catalyst bed by means of the perforated plate 5.

The lower section A of the converter 1 is charged with catalyst supported on the perforated plate 5 to hold the catalyst out of direct contact with the hydrogen inlet jets 4a, the section being only partially filled to keep the catalyst below the temperature control coil 6. The catalyst in the middle compartment B is supported on the screen 7 and is only partially filled so that a catalyst-free space remains at the top for the temperature control coil 8. Similarly compartment C is only partially filled with catalyst which is supported on screen 9 for holding the catalyst in the compartment and out of immediate contact with the temperature control coil 8. The liquid level, as has been stated, is maintained above the catalyst in compartment C but as shown is maintained well below the top of the converter. A vapor exit pipe 10 is provided at the top of the hydrogenation converter which conducts the unused hydrogen, inert gases, and vapors driven from the reaction zone into a condenser 11 which is provided with conventional cooling means entering and leaving the condenser through pipes 12 and 13 respectively. The condensate from the condenser 11 passes directly into the benzene supply pipe 2 and through said pipe is returned to the hydrogenation converter 1. The non-condensable vapors pass from the system through pipe 14. If desired, the vapors from pipe 14 may be reintroduced into the converter by connection with the hydrogen manifold 3. The reactant and products resulting from the reaction pass downwardly through the converter and the latter pass out of the converter through pipe 15.

A converter such as that disclosed may be used for hydrogenation reactions generally and particularly those which have a relatively high exothemic heat of reaction. When such organic compounds are hydrogenated the major portion of the hydrogenation takes place in the upper part of the converter and consequently the major portion of the heat resulting from the reaction is likewise produced in this part of the converter. When equilibrium conditions have been established and a balance of the system realized by regulating the flow of the compound to be hydrogenated into the converter concurrently with a regulation of the hydrogen input together with the hydrogenated product discharged from the converter, it will be found that the temperature within the reactant liquid will vary from a high at the top of the converter to a low at the bottom thereof. This temperature difference or gradient will be maintained and will remain substantially constant, the exothermic heat of reaction being removed mainly by the cooling water used in the condenser. In many hydrogenation reactions equilibrium conditions for maximum yield do not necessarily likewise constitute conditions for maximum rate of the reaction. It is possible, therefore, by means of this method of hydrogenation to employ at the top of a converter conditions for maximum rate of hydrogenation and toward the bottom of the converter conditions more favorable for substantially complete hydrogenation of the product. By a proper regulation of the temperature throughout the converter, therefore, it is possible to obtain substantially quantitative yields of the hydrogenated product, at reaction rates approaching those corresponding to the maximum converter temperature, but with amounts of excess hydrogenation approaching those corresponding to the more favorable equilibrium at the lower converter temperature.

The invention may be illustrated more specifically by the hydrogenation of benzene to cyclohexane. The converter is charged with a suitable catalyst and preferably a rugged catalyst having a mesh size or from 1 to 4. It has been found that a highly active catalyst for the reaction may be prepared from a nickel-aluminum alloy containing approximately 40% nickel and 60% aluminum, which is crushed to size prior to being placed in the converter. Valves 16 are closed and through valves 17 and pipes 10 and 15 a hot dilute aqueous sodium hydroxide solution is passed until from 20-25% of aluminum in the alloy has been removed. The hot sodium hydroxide solution is then displaced from the converter by the consecutive displacement with cold sodium hydroxide solution, cold water, methanol, and cyclohexane. Valves 17 are then closed. By means of the heating coils 6 and 8 the cyclohexane is heated within the reaction zone to between 150 and 200° C. Valves 16 are then opened and benzene is introduced through pipe 2 while simulteneously hydrogen is introduced through the manifold 3, under a suitable pressure to build up a pressure in the converter to about 25 atmospheres. Hydrogen bubbles upwardly countercurrent to the descending benzene liquid and the exothermicity of the reaction is such that the temperature rises rapidly at the point of greatest reaction rate which is within the top section of the converter. At this point the temperature under this pressure is at equilibrium in the neighborhood of 210-220° C. Unconverted hydrogen passes from the surface of the liquid together with any inerts contained in the hydrogen used together with vaporized benzene or cyclohexane which mixture of permanent gases and vapors passes through pipe 10 into the condenser. In this condenser the benzene and cyclohexane are condensed, are passed into the benzene delivery tube 2 and from this tube flow directly into the top of the converter. Uncondensible gases in the vapors pass from the system through pipe 14. If these gases are high in hydrogen content they may be reintroduced through hydrogen manifold 3 into the converter. When the reaction has started a heating or cooling fluid is supplied, if necessary, through coils 6 and 8 in order to maintain the temperature at the proper amount. A temperature at the product end of the converter of 150° C. with the temperature of approximately 210° C. at the top of the converter gives excellent yields.

The flow of hydrogen into the converter should be at the rate of at least 3 moles per mole of the benzene to satisfy stoichiometric requirements and as this is a reaction conducted preferably to equilibrium an excess of hydrogen over and above stoichiometric requirements should be used. For instance, greater than 99% conversion of the benzene to cyclohexane is obtained, under the above-described conditions, with a ratio of hydrogen to benzene on a molar basis of at least 3.5 to 1 (a 17% excess of hydrogen). If, however, equilibrium is established at a temperature of 210° more than 5/1 molar hydrogen to benzene ratio for 99% conversion, or more than a 67% excess of hydrogen is required.

Although there will be some temperature gradient without cooling by means of coils 6 and 8, because of the cooling action of the upflowing hydrogen and of heat loss through the converter walls, sufficient cooling to establish a differential temperature gradient of 30 to 175° C. between the top and bottom of the converter is preferred. The benzene is hydrogenated as it flows downwardly through the hydrogen converter 1 in contact with the catalyst and upflowing hydrogen, and an excellent yield of cyclohexane from the benzene and hydrogen is thereby provided. The cyclohexane is discharged from the converter through pipe 15 and will be found to contain in accord with the specific conditions herein designated better than 99% cyclohexane.

The preferred embodiment of the invention has been described utilizing a catalyst containing nickel and aluminum. Other suitable hydrogenation catalysts may be employed, however, such, for example, as nickel oxide, copper chromate, and mixtures of nickel, copper, and copper chromate, copper obtained by the reduction of copper oxide, nickel supported on various supports such as kieselguhr, silica gel, and the like, mixtures of copper, chromium, zinc, mixtures of zinc, and chromium, and in fact any hydrogenation catalyst suitable for reactions of this nature.

The reaction has been illustrated as being conducted at a temperature in the proximity of 210-220° C. It has been found, however, that the benzene to cyclohexane reaction occurs over a wide range of temperatures and will proceed at a slow rate, at room temperatures, and with increasingly greater rate of reaction up to the boiling point of the reactants at the conditions under which the reaction is conducted. In order to obtain the exceptional yields of reactants at rapid rates made possible by this invention the reaction in the top of the converter may be conducted at a temperature of 180 to 350° C. and preferably between 180 to 250° C. while the temperature in the bottom of the converter should preferably be below 180° C. and may be as low as room temperature. Moreover, the reaction proceeds favorably under elevated pressures and preferably at pressures between 10 and 60 atmospheres although pressures from atmospheric pressure to 700 atmospheres may be employed if desired.

After the reaction has been initiated in the manner described a temperature differential is set up, as described, within the converter, inasmuch as the pure benzene flowing into the top of the converter rapidly reacts in the upper section thereof with hydrogen to give off considerable heat of reaction. As the benzene now containing some cyclohexane passes downwardly into the converter the cyclohexane increases in concentration as the benzene decreases in concentration until at substantially the bottom of the converter there is no more benzene to be hydrogenated and there is found an approximately 99% or better concentration of the cyclohexane. Inasmuch as there is no benzene to be reacted with hydrogen at the bottom of the converter there is substantially no exothermic heat of reaction at that point. Moreover, at this point the cool hydrogen is introduced and it is instrumental in removing sensible heat present in the liquid. This condition is most desirable for the reason that while the hydrogenation of benzene, as do most chemical reactions, proceeds more rapidly at higher temperatures, nevertheless, high yields of reactants are favored by lower temperatures of reaction and consequently this system of hydrogenation provides higher reaction rates during the initial stages of the reaction with lower reaction rates and more favorable equilibrium conditions, which are sufficient to give substantially 100% conversion, during the latter stages of the reaction.

Moreover, by varying the pressure on the system, it is possible to raise or lower the temperature within the converter for example by increasing the pressure above 25 atmospheres as is designated in the preferred embodiment described, the amount of reactants being vaporized from the reaction zone decrease with an attendant decrease in the amount of condensable vapors entering the condenser and as a consequence the temperature of the reaction will be increased. Contrariwise by decrease in the pressure lower temperatures are obtainable.

To provide this desirable effect of a differential temperature used during the reaction, it is advantageous to employ a vessel having greater length than cross section for as the length of the vessel approaches the cross sectional diameter thereof the temperature gradient in the liquid decreases until it is substantially non-existent. Accordingly, it is desirable to have a ratio of the length to the diameter of the vessel of at least 1.5:1.

The apparatus has been described with particular reference to carrying out the reaction with the countercurrent flow of benzene and hydrogen. Inasmuch as the cooling effect of the hydrogen is of minor importance it is likewise possible, although not as desirable, to carry out the process and at the same time obtain the good yields of reactants by co-current flow of hydrogen and benzene through the apparatus. When operating in this manner, however, a greater amount of heat must be removed from the bottom of the converter by, for example, extending the length, thereby losing heat through greater wall surface exposed, more elaborate cooling coils in this portion of the converter, or other means.

I claim:

1. A liquid phase process for the hydrogenation of benzene to cyclohexane wherein the benzene is continuously introduced into a reaction zone and the reaction mixture is continuously discharged from that zone which comprises initiating the hydrogenation of the benzene by contacting liquid benzene with a hydrogenation catalyst and passing the benzene countercurrent to the flow of hydrogen at an elevated temperature and gradually lowering the contact temperature of the reacting mixture until a substantially quantitative yield of cyclohexane is obtained, the gradual lowering of the contact temperature being accomplished with a maximum temperature at the inlet of the reaction zone and a minimum temperature at the exit of the reaction zone.

2. A liquid phase process for the hydrogenation of benzene to cyclohexane wherein the benzene is continuously introduced into a reaction zone and the reaction mixture is continuously discharged from that zone which comprises initiating the hydrogenation of the benzene by contacting liquid benzene with a hydrogenation catalyst and passing the benzene countercurrent to the flow of hydrogen at a temperature between 180 and 350° C., and gradually lowering the contact temperature of the reacting mixture until a substantially quantitative yield of cyclohexane is obtained, the gradual lowering of the contact temperature being accomplished with a maximum temperature at the inlet of the reaction zone and a minimum temperature at the exit of the reaction zone.

3. A liquid phase process for the hydrogenation of benzene to cyclohexane wherein the benzene is continuously introduced into a reaction zone and the reaction mixture is continuously discharged from that zone which comprises initiating the hydrogenation of the benzene by contacting liquid benzene with a hydrogenation catalyst and passing the benzene countercurrent to the flow of hydrogen at a temperature between 180 and 225° C. and at a pressure between 10 and 60 atmospheres and terminating the reaction at a temperature below 180° C., the reaction being conducted by gradually lowering the temperature from a maximum of from 180 to 225° C. at the inlet of the reaction zone to a minimum temperature below 180° C. at the exit of the reaction zone.

4. A liquid phase process for the hydrogenation of benzene to cyclohexane wherein the benzene is continuously introduced into a reaction zone and the reaction mixture is continuously discharged from that zone which comprises initiating the hydrogenation of the benzene by contacting liquid benzene with a hydrogenation catalyst and passing it countercurrent to the flow of hydrogen at a temperature of approximately 210° C. and at a pressure of approximately 25 atmospheres and terminating the reaction at a temperature of approximately 150° C., the reaction being conducted by gradually lowering the temperature from the maximum temperature of about 210° C. at the inlet of the reaction zone to a minimum temperature of about 150° C. at the exit of the reaction zone.

5. A liquid phase process for the hydrogenation of benzene to cyclohexane wherein the benzene is continuously introduced into a reaction zone and the reaction mixture is continuously discharged from that zone which comprises initiating the reaction by contacting liquid benzene with a hydrogenation catalyst, passing liquid benzene countercurrent to and in contact with hydrogen at a temperature below the boiling point of the reaction mixture, under the reaction conditions being employed, and thereafter gradually lowering the temperature of the reacting mixture until substantially all of the benzene has been hydrogenated to cyclohexane, the gradual lowering of the contact temperature being accomplished with a maximum temperature at the inlet of the reaction zone and a minimum temperature at the exit of the reaction zone.

6. A liquid phase process for the catalytic hydrogenation of benzene to cyclohexane wherein the benzene is continuously introduced into a reaction zone and the reaction mixture is continuously discharged from that zone which comprises initiating the reaction by contacting liquid benzene with a hydrogenation catalyst and passing the benzene countercurrent to and in contact with hydrogen at the highest temperature at which the benzene is hydrogenated and terminating the reaction by contacting the partially hydrogenated reaction product with hydrogen and a hydrogenation catalyst at the lowest temperature at which the benzene is hydrogenated, which temperature is lower than the temperature at which the hydrogenation is initiated, the temperature being controlled by the latent heat of evaporation of the reaction mixture.

7. A liquid phase process for the catalytic hydrogenation of benzene to cyclohexane which comprises introducing liquid benzene into the upper portion of a hydrogenation converter having a ratio of length to cross section of at least 1.5 to 1 and into contact with a hydrogenation catalyst therein at a temperature between 100 and 350° C. and at elevated pressures the liquid benzene flowing countercurrent to the flow of hydrogen, and thereafter introducing the partially hydrogenated reaction mixture into contact with a hydrogenation catalyst and into another portion of the converter wherein the hydrogenation is conducted under a temperature at least 5° C. below the initial reaction temperature the reaction being conducted by gradually lowering the temperature from the maximum temperature at the beginning of the reaction to the minimum temperature at the end of the reaction.

8. A liquid phase process for the catalytic hydrogenation of benzene to cyclohexane which comprises initiating the reaction by introducing liquid benzene into contact with a hydrogenation catalyst, countercurrent to the flow of hydrogen, and into a reaction zone maintained at a temperature between 180 and 250° C. and at a pressure between 10 and 60 atmospheres, and thereafter passing the resulting partially hydrogenated reaction mixture into another reaction zone and therein contacting it with a hydrogenation catalyst at a temperature at least 5° C. below the initial reaction temperature the reaction being conducted by gradually lowering the temperature from the maximum temperature at the beginning of the reaction to the minimum temperature at the end of the reaction.

9. The process of claim 1 wherein the temperature differential is between 30 and 175° C.

10. The process of claim 1 wherein a temperature differential is maintained by evaporation of benzene and cyclohexane vapors from the reaction mixture, condensing them and returning them to the reaction mixture.

11. The process of claim 1 wherein a temperature differential between 30 and 175° C. is maintained by evaporation of benzene and cyclohexane vapors from the reaction mixture, condensing them and returning them to the reaction mixture.

MERLIN DEWEY PETERSON.